(12) United States Patent
Onishi et al.

(10) Patent No.: US 10,367,397 B2
(45) Date of Patent: Jul. 30, 2019

(54) CONTROLLER-INTEGRATED ROTARY ELECTRIC MACHINE AND METHOD FOR MANUFACTURING THE SAME

(71) Applicant: Mitsubishi Electric Corporation, Tokyo (JP)

(72) Inventors: Yoshihiko Onishi, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 15/109,744

(22) PCT Filed: May 12, 2014

(86) PCT No.: PCT/JP2014/062567
§ 371 (c)(1),
(2) Date: Jul. 5, 2016

(87) PCT Pub. No.: WO2015/173855
PCT Pub. Date: Nov. 19, 2015

(65) Prior Publication Data
US 2016/0329781 A1    Nov. 10, 2016

(51) Int. Cl.
*H02K 11/33* (2016.01)
*H02K 5/04* (2006.01)
(Continued)

(52) U.S. Cl.
CPC .............. *H02K 11/33* (2016.01); *H02K 5/04* (2013.01); *H02K 5/10* (2013.01); *H02K 11/0094* (2013.01); *H02K 15/14* (2013.01)

(58) Field of Classification Search
CPC ............. H02K 15/14; H02K 5/10; H02K 5/04
(Continued)

(56) References Cited

U.S. PATENT DOCUMENTS 5,113,103 A * 5/1992 Blum .................. H02K 5/04
310/402
2010/0301691 A1* 12/2010 Cors .................. H02K 5/1677
310/83
(Continued)

FOREIGN PATENT DOCUMENTS

CN    101834498 A    9/2010
CN    101981786 A    2/2011
(Continued)

OTHER PUBLICATIONS

Extended European Search Report dated Dec. 5, 2017 issued by European Patent Office in counterpart application No. 14891704.0.
(Continued)

*Primary Examiner* — Terrance L Kenerly
(74) *Attorney, Agent, or Firm* — Sughrue Mion, PLLC; Richard C. Turner

(57) ABSTRACT

A controller-integrated rotary electric machine in which a controller is coupled to a rotary electric machine main unit using a simple coupling structure while ensuring endurance of the coupling is provided. The controller-integrated rotary electric machine includes: a first housing that houses a controller or a rotary electric machine main unit driven according to a command from the controller and that includes a thin-walled portion at an edge on an outer periphery side; and a second housing that is coaxially aligned with the first housing and has a groove in which an abutting face having a linearly inclined cross-sectional shape is formed from the outer periphery side toward a radial direction, wherein the first housing is joined to the second housing by folding the thin-walled portion of the first housing along the abutting face of the second housing and performing swaging.

15 Claims, 7 Drawing Sheets

(51) Int. Cl.
  *H02K 15/14* (2006.01)
  *H02K 11/00* (2016.01)
  *H02K 5/10* (2006.01)
(58) Field of Classification Search
  USPC .......................................................... 310/89
  See application file for complete search history.

(56) References Cited

U.S. PATENT DOCUMENTS

| | | | |
|---|---|---|---|
| 2011/0006628 A1 | 1/2011 | Ogino et al. | |
| 2013/0140964 A1* | 6/2013 | Matsunaga | B62D 5/0403 310/68 B |
| 2014/0091683 A1 | 4/2014 | Ito et al. | |
| 2016/0006324 A1 | 1/2016 | Akutsu et al. | |

FOREIGN PATENT DOCUMENTS

| | | |
|---|---|---|
| JP | 59-208891 A | 11/1984 |
| JP | 5-29281 U | 4/1993 |
| JP | 9-126323 A | 5/1997 |
| JP | 11-153074 A | 6/1999 |
| JP | 2007-165022 A | 6/2007 |
| JP | 2013-99094 A | 5/2013 |
| WO | 2013/038572 A1 | 3/2013 |
| WO | 2014/054155 A1 | 4/2014 |

OTHER PUBLICATIONS

International Search Report for PCT/JP2014/062567 dated Jul. 22, 2014 [PCT/ISA/210].
Communication dated Nov. 8, 2016, from the Japanese Patent Office in counterpart Japanese application No. 2016-518660.
Communication dated Apr. 28, 2018 issued by the State Intellectual Property Office of People's Republic of China in counterpart application No. 201480078774.4.
Communication dated Jan. 16, 2019 from European Patent Office in counterpart EP Application No. 14 891 704.0.
Communication dated Jan. 11, 2019 from the State Intellectual Property Office of the P.R.C. in counterpart Application No. 201480078774.4.

* cited by examiner

CONTROLLER-INTEGRATED ROTARY ELECTRIC MACHINE AND METHOD FOR MANUFACTURING THE SAME

CROSS REFERENCE TO RELATED APPLICATIONS

This application is a National Stage of International Application No. PCT/JP2014/062567, filed on May 12, 2014, the contents of all of which are incorporated herein by reference in their entirety.

TECHNICAL FIELD

The present invention relates to a controller-integrated rotary electric machine in which a controller is coupled to and coaxially integrated with a rotary electric machine and relates to a method for manufacturing the controller-integrated rotary electric machine.

BACKGROUND ART

For a conventional controller-integrated rotary electric machine in which a control unit is coaxially integrated with a rotary electric machine driven by a command from the control unit, in order to couple the rotary electric machine to a control unit portion, a structure in which protruding portions provided on their peripheries are connected by screws has been proposed.

However, the controller-integrated rotary electric machine in which the control unit and the rotary electric machine are coupled by the screwing structure needs the protruding portions for the screws, which makes the layout difficult and causes a drawback in downsizing.

Furthermore, in order to couple the rotary electric machine to the control unit portion, what is called a shrink fitting structure and method for coupling two objects using thermal expansion and shrinkage has been proposed. However, the shrink fitting structure needs a complicated process and also needs a countermeasure against heat. Furthermore, for welding, if both the control unit portion and the rotary electric machine are made of a ferrous metal, they can be welded, but, if one or both of them are made of a metal with good heat conductivity, such as aluminum, welding is difficult. In addition, high heat is applied, although locally, a countermeasure against heat is needed for electronics components and the like in the control unit portion.

Still furthermore, welding, swaging and the like are also used as a structure and method for coupling the rotary electric machine to the control unit portion. For a swaged structure, an exterior yoke on the rotary electric machine side is extended along the axial-length direction, then an edge of the extended yoke is bent into a groove provided in the outer periphery on the control unit side and swaged, thereby coupling the rotary electric machine to the control unit. In a conventional swaged structure, a yoke of an electromagnetic drive unit portion is extended, the extended portion being thin cylindrical, then the tip of the extended portion is bent in an L-shape or obliquely into one face of a stationary core to be swaged across the whole circumference (e.g., see PTL 1).

CITATION LIST

Patent Literature

PTL 1: JP-A-11-153074
PTL 2: JP-A-2007-165022

SUMMARY OF INVENTION

Technical Problem

However, although when swaging is performed in a place with a spatial margin, as with the edge of the conventional stationary core, the angle, length and the like of swaging is not limited, in order to perform swaging within a given small space and, furthermore, ensure an endurance of the swaging, some ingenious device is needed for swaging. Furthermore, when some swage member materials are folded, the materials may face a problem of cracks in the folded portion, insufficient swaging or the like. Furthermore, in a conventional swaged structure disclosed in PTL 2, the edge portion of a thin cylindrical portion extended beyond a groove is swaged to the shape of the groove. The rotary electric machine is coupled to the control unit by the thin cylindrical portion causing the sides of the groove to press against each other. If the apparatus is small and lightweight, the endurance of this coupling structure may be secured. However, if both the units to be coupled are relatively large and heavy, such a swaged structure in the small area of the sides of the groove has a problem with endurance.

In order to solve the problem as described above, it is an object of the present invention to provide a controller-integrated rotary electric machine having an improved swaged portion structure and providing secure coupling even when heavy units are to be joined or even when a rotary electric machine propagating vibration due to driving is to be swaged and also provides a method for manufacturing the controller-integrated rotary electric machine.

Solution to Problem

The controller-integrated rotary electric machine in accordance with the invention includes: a first housing that houses a controller or a rotary electric machine main unit driven according to a command from the controller and that includes a thin-walled portion at an edge on an outer periphery side; and a second housing that is coaxially aligned with the first housing and has a groove in which an abutting face having a linearly inclined cross-sectional shape is formed from the outer periphery side toward a radial direction, wherein the first housing is joined to the second housing by folding the thin-walled portion of the first housing along the abutting face of the second housing and performing swaging.

Furthermore, the method for manufacturing a controller-integrated rotary electric machine in accordance with the invention includes: providing a first housing that contains a controller or a rotary electric machine main unit driven according to a command from the controller and that includes a thin-walled portion at an edge on an outer periphery side and a first axial positioning portion having a face perpendicular to an axial direction; providing a second housing that is coaxially aligned with the first housing and has a groove formed from the outer periphery side toward a radial direction and a second axial positioning portion provided on an edge side with respect to the groove and having a face perpendicular to the axial direction; fitting the first housing to the second housing by causing the first axial positioning portion to abut against the second axial positioning portion while causing a first outer periphery face provided between the second axial positioning portion and the groove on the outer periphery side to slide on a first inner periphery face provided on an inner vertical face of the thin-walled portion; setting the first housing and the second housing fitted thereto on a swaging machine; causing the first and second axial positioning portions to press against each other with a predetermined pressure; joining the first housing to the second housing by moving a swaging jig of the swaging machine to fold the thin-walled portion toward an abutting face having a linearly inclined cross-sectional shape provided on an inner periphery face of the grove and perform swaging; and returning the swaging jig to the initial position.

Advantageous Effects of Invention

According to the controller-integrated rotary electric machine of the invention, the first housing is joined to the second housing by folding the thin-walled portion of the first housing along the abutting face formed in the groove of the second housing and having a linearly inclined cross-sectional shape and performing swaging, so, even when relatively large and heavy units are coupled or a unit is coupled to a rotary electric machine propagating vibration, the unit can be securely coupled by swaging.

Furthermore, according to the method for manufacturing a controller-integrated rotary electric machine of the invention, the swaged portion can be simplified and secure swaging can be performed with a controlled pressure and stroke.

The foregoing and other objects, features, aspects and advantages of the present invention will become more apparent from the following detailed description of the present invention when taken in conjunction with the accompanying drawings.

DESCRIPTION OF EMBODIMENTS

Figure 1:
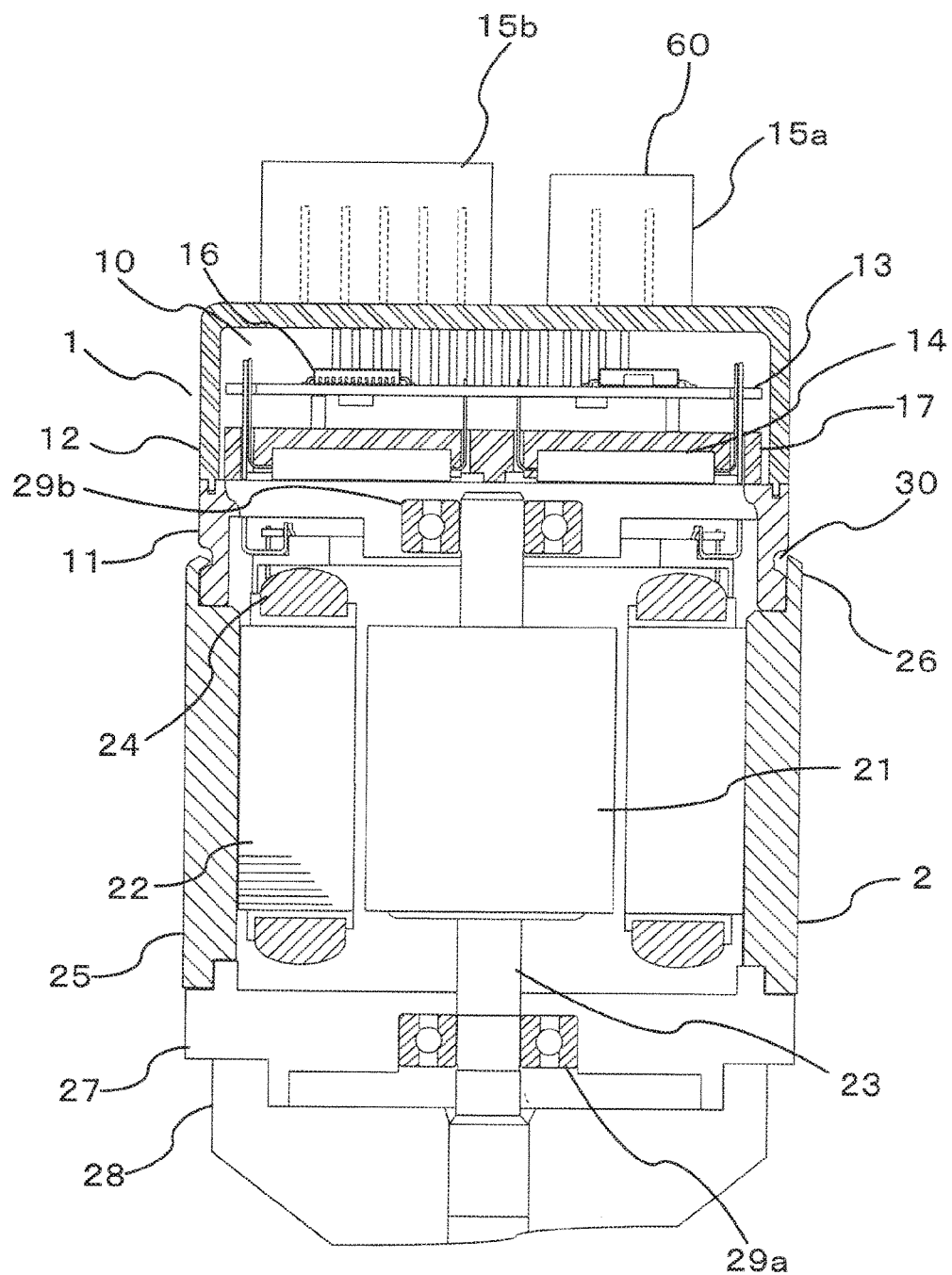
FIG. 1 is a partial cross-sectional view of a controller-integrated rotary electric machine in a first embodiment of the invention.

A first embodiment of the invention is described below with reference to the drawings.

Note that, through the drawings, the same reference numerals denote the same or corresponding components.

First Embodiment

FIG. 1 is a partial cross-sectional view of a controller-integrated rotary electric machine in the first embodiment of the invention. In FIG. 1, a controller-integrated rotary electric machine 60 includes a control unit 1 and a motor 2 as a rotary electric machine that are integrated with each other. Specifically, the control unit 1 is coaxially aligned with an output shaft 23 of the motor 2. In the first embodiment, a controller-integrated rotary electric machine in an electric power steering apparatus installed in a vehicle is described. The electric power steering apparatus is mounted on a steering column or a rack shaft of the vehicle and is downsized by integrating the motor 2 with the control unit 1 for controlling the motor 2. The motor 2 has a rotor 21 having the output shaft 23 at the center and a permanent magnet mounted thereon and a stator 22 having a wire-wound coil 24 wound therearound. The rotor 21 and the stator 22 are included in a yoke 25. A front frame 27 and a gear mechanism 28 for transmitting output rotation are mounted on the output side (in the downward direction of the figure) of the output shaft 23.

The motor 2 is a brushless or brushed motor including multiphase windings, for example, three or more phase windings. The control unit 1 is coaxially placed on the side opposite to the output side (in the upward direction of the figure) of the output shaft 23 of the motor 2. The control unit 1 has a function of supplying current to the wire-wound coil 24 of the motor 2. To perform the function, the control unit 1 generally includes a control board 13 having a CPU 16 for computing a controlled variable mounted thereon, a power module 14 including what is called an inverter circuit for supplying current to the wire-wound coil 24 and a hookup member 17 for hooking up the control board 13 to the power module 14, in a space 10 enclosed with an upper frame 11 and a cover 12. Furthermore, connectors 15a, 15b to be connected to a torque sensor for detecting the steering force of the steering wheel, a vehicle speed sensor and the like as well as a power supply line (not shown) are mounted on the upper portion of the cover 12.

The upper frame 11 has a function as a cap of the control unit 1, a function of securing the power module 14 and dissipating heat therefrom and a function of partitioning with the motor 2. A coil terminal extending from the wire-wound coil 24 of the motor 2 passes through the upper frame 11 and is connected to an output pin of the power module 14. The cover 12 is resin-molded. The upper frame 11 is desirably made of a metal that is good at heat dissipation, such as aluminum or magnesium alloy, if possible. Furthermore, the upper frame 11 is fixed to the cover 12 enclosing the control board 13, the power module 14 and the like. Therefore, the coupling between the motor 2 and the control unit 1 is specifically the coupling between the upper frame 11 and the yoke 25.

Next, the coupling between the motor 2 and the control unit 1 is described. In FIG. 1, a thin-walled portion 26 extends from the upper edge of the yoke 25 on the outer periphery side. On the other hand, the upper frame 11 has a groove 30 formed therein. The groove 30 is formed from the outer periphery side of the upper frame 11 toward the radial direction. The tip of the thin-walled portion 26 is folded into the groove 30 and swaged. In FIG. 1, for convenience, a pre-swaged state of the thin-walled portion 26 is shown on the right side, and a post-swaged state is shown in the left side. However, needless to say, the thin-walled portion 26 on the right side is eventually swaged as with the left side.

Figure 2:
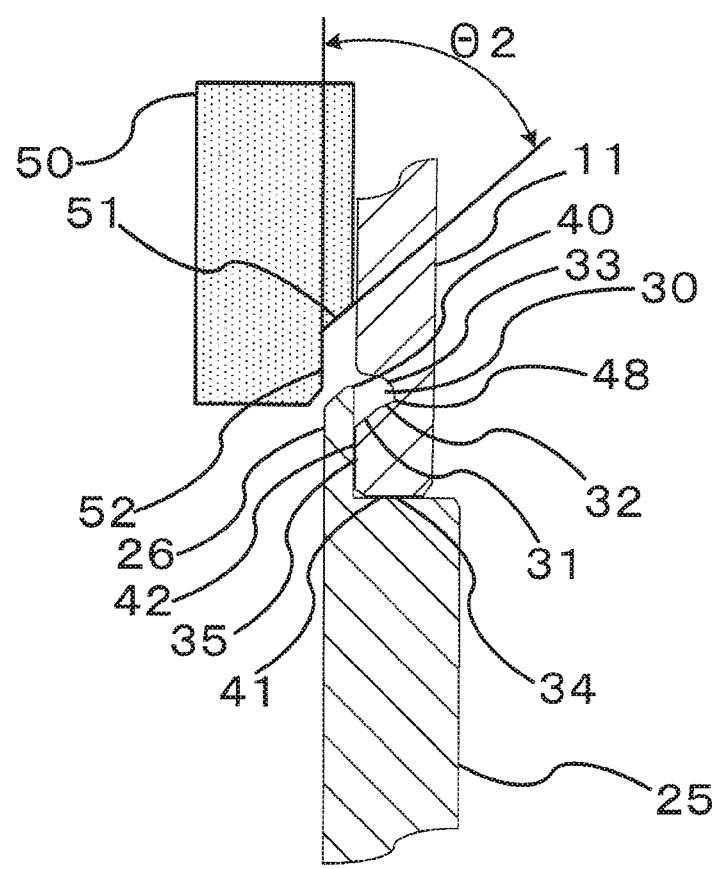
FIG. 2 is an enlarged view showing a pre-swaged state of a swaged portion in FIG. 1.

FIG. 2 is an enlarged sectional view of a portion of the upper frame 11 and the yoke 25 showing the pre-swaged state of the upper frame 11 and the yoke 25. As shown in FIG. 2, the upper portion of the yoke 25 has the thin-walled portion 26 extending therefrom on the outer periphery side, and has a first axial positioning portion 41 having a face almost perpendicular to the output shaft 23. The thin-walled portion 26 has a first inner periphery face 42 which is a vertical face on the inner periphery side. Furthermore, a tip 40 of the thin-walled portion 26 is diagonally cut to have an inclined face.

On the other hand, the upper frame 11 has a second axial positioning portion 34 having a face perpendicular to the axial direction on the lower edge side with respect to the groove 30. Furthermore, the upper frame 11 has a first outer periphery face 35 between the second axial positioning portion 34 and the groove 30 on the outer periphery side.

As shown in FIG. 2, the groove 30 has a structure in which an abutting face 31 having a linearly inclined cross-sectional shape extends in the lower side of the groove 30, which leads to a groove bottom 32, which further leads to a groove side face 33 in the upper side. The abutting face 31 is an inclined but flat face.

The first axial positioning portion 41 is abutted against the second axial positioning portion 34, and the first inner periphery face 42 is abutted against the first outer periphery face 35, and then a pressure is applied from top to bottom in the figure to cause them to press against each other. Next, the tip portion of the thin-walled portion 26 is folded to the right in the figure to form a swaged portion 47. In the swaged portion 47, the first inner periphery face 42 is in close contact with the abutting face 31 and the thin-walled portion 26 is bent and plastically deformed. The upper frame 11 and the yoke 25 are coupled by the close contact between the abutting face 31 and the first inner periphery face 42 and the close contact between the first and second axial positioning portions 41, 34. Accordingly, the abutting face 31 desirably has an inclination angle θ of generally 0 to 60 degrees. Furthermore, the first inner periphery face 42 and the first outer periphery face 35 are preferably long in axial length.

Figure 3:
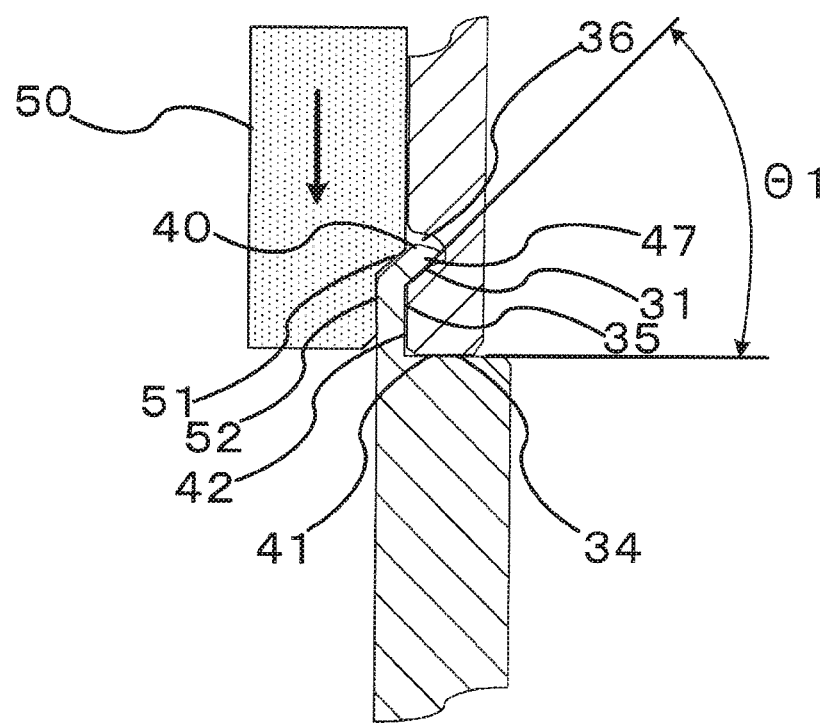
FIG. 3 is an enlarged view showing a post-swaged state of the swaged portion in FIG. 1.

FIG. 3 is an enlarged sectional view of a portion of the upper frame 11 and the yoke 25 showing the post-swaged state of the upper frame 11 and the yoke 25. In FIG. 3, the tip 40 of the thin-walled portion 26 is not in contact with any face of the groove 30. A gap 36 is formed between the thin-walled portion 26 of the yoke 25 and the upper frame 11. If the gap 36 does not exist and the tip 40 of the thin-walled portion 26 of the yoke 25 abuts against the upper frame 11, the swaging force coupling the yoke 25 and the upper frame 11 may be dispersed to weaken the coupling. The swaging force is achieved only when the first and second axial positioning portions 41, 34, the abutting face 31 and the first inner periphery face 42 are at predetermined positions. Accordingly, the gap 36 serves as a relief area for swaging.

In this way, the swaging force in a downward direction to the right in the figure caused by folding the thin-walled portion 26 can stably provide the secure holding in the radial direction by the close contact between the abutting face 31 and the first inner periphery face 42 and the secure holding in the axial direction by the close contact between the first and second axial positioning portions 41, 34.

Note that, after swaging, the first outer periphery face 35 and the first inner periphery face 42 abut against each other or are separated by a very small gap, and the first outer periphery face 35 and the first inner periphery face 42 are not swaged together. Before swaging, the first inner periphery face 42 and the first outer periphery face 35 are caused to slide on and abut against each other, and swaging is performed from the boundary of the abutting face 31 and the first outer periphery face 35. Causing the first inner periphery face 42 and the first outer periphery face 35 to slide on and abut against each other before swaging is a precondition for swaging. Causing the first inner periphery face 42 and the first outer periphery face 35 to slide on and abut against each other before swaging automatically allows swaging to be performed at a predetermined position. Furthermore, in the groove bottom 32, the connection part between a deepest part 48 and the abutting face 31 is connected to the deepest part 48 at an angle steeper than the inclination angle of the abutting face 31. So, the connection to the deepest part 48 may include two stages of steps. In this way, the groove bottom 32 has an angle such that the gap 36 exists between the tip 40 of the thin-walled portion 26 and the groove 30 from the end of the abutting face 31, which enables a secure and stable holding. Note that, if the gap 36 is formed near the deepest part 48, any angle may be used for the groove side face 33.

The swaged structure as described above can cause a desired swaging force to be exerted only at a desired position, prevent dispersion of the swaging force due to unwanted close contact, and suppress spring-back after swaging by plastic deformation. As a result, even in coupling heavy parts, their endurance can be improved. Note that, in FIG. 1, the components of the control unit 1 can also be stacked in reverse order. Specifically, in the control unit 1, the control board 13 can be placed on the motor 2 side, then the hookup member 17 can be placed over the control board 13, then the power module 14 can be placed over the hookup member 17, then the heat sink can be placed over the power module 14, and then the connectors 15a, 15b can be placed over the heat sink. This can be similarly configured by causing the yoke 25 to encompass the upper frame 11 in which a bearing 29b is placed, installing a housing in place of the cover 12 in FIG. 1, and providing the groove 30 and the second axial positioning portion 34 to the housing.

In some conventional controller-integrated rotary electric machines as a comparison example, these parts are coupled by bolting. However, bolting needs a plurality of tapped holes for bolting on the outer periphery, and parts for providing the tapped holes would protrude from the outer periphery. When installed in a vehicle, the parts for providing the tapped holes need to be placed so as not to interfere with other parts, so the placement of the parts needs to differ from vehicle to vehicle. Furthermore, the motor 2 is driven to generate vibration which may propagate to the control unit 1 because of the coupling of them. So, depending on the type of driving device, insufficient coupling force may cause a problem in endurance. Thus, in the first embodiment, the coupling of them is performed by the swaged structure, which can eliminate protruding parts and improve close contact, thereby improving installability to vehicles.

Next, a method for manufacturing the controller-integrated rotary electric machine of the first embodiment is described. For the motor 2, the stator 22 having the wire-wound coil 24 wound therearound is attached to the yoke 25, then the yoke 25 is coupled to the front frame 27 which is a lower frame in which a bearing 29a is mounted, and then the output shaft 23 integrated with the rotor 21 is put through the center of the stator 22 and the bearing 29a. Next, the control unit 1 is stacked over the motor 2. The control unit 1 may be either in a completed state or uncompleted state. Here, the completed state means that the cover 12 having the control board 13, the power module 14 and the connectors 15a, 15b and the upper frame 11 to which the bearing 29b is attached are assembled. On the other hand, the uncompleted state means that the cover 12 has not been fabricated with the upper frame 11, the control board 13, the power module 14 and the connectors 15a, 15b yet. Whether completed or uncompleted, the swaging process described below is the same.

In the following, the case of using the control unit 1 in the uncompleted state is described. The upper frame 11 with the bearing 29b attached thereto is stacked over the motor 2 fabricated as above. This stacking is performed with the bearing 29b aligned with the edge of the output shaft 23 and with the edge of the wire-wound coil 24 aligned with an insertion hole (not shown) of the upper frame 11. While the first outer periphery face 35 of the upper frame 11 is slid on the first inner periphery face 42 of the thin-walled portion 26, the first axial positioning portion 41 and the second axial positioning portion 34 are pressed up to an abutment position. With this state, the upper frame 11 is stacked over the motor 2, then the stacked upper frame 11 and motor 2 is set on a swaging machine. The swaging machine first causes the first and second axial positioning portions 41, 34 to press against each other with a predetermined pressure. Then, a swaging jig 50 is moved downward in the axial direction of the motor 2 along the outer periphery of the upper frame 11.

As shown in FIG. 2, the swaging jig 50 has a cylindrical shape with an inclined face 51 and a second inner periphery face 52 formed therein. The inclined face 51 has an inclination angle θ2 that is desirably equal to or smaller than that of the diagonally cut face of the tip 40 of the thin-walled portion 26. Furthermore, a very small gap may exist between the second inner periphery face 52 and the outer periphery of the thin-walled portion 26. The swaging jig 50 having such a shape slowly moves downward, then the inclined face 51 of the swaging jig 50 abuts against the tip 40 of the thin-walled portion 26, and then the inclined face 51 further moves downward while pressing the tip 40 to the right in the figure. Furthermore, as shown in FIG. 3, the swaging jig 50 stops with a predetermined load. This stopped state is shown in FIG. 3. The inclined face 51 of the swaging jig 50 presses the thin-walled portion 26 including the tip 40, folding the thin-walled portion 26 to the right in the figure and causing plastic deformation along a face defined by the abutting face 31. Furthermore, the second inner periphery face 52 of the swaging jig 50 prevents the thin-walled portion 26 from protruding outward due to the folding.

Then, the swaging jig 50 is returned to the initial upper position. In this way, the yoke 25 housing the motor 2 is coupled to the upper frame 11. Then, the power module 14 is placed, then the control board 13 with various electronic components mounted thereon is stacked over the power module 14, and then the pins of the power module 14 are welded to the terminals of the wire-wound coil 24 and the other terminals are connected by soldering. Next, the cover 12 with the connectors 15a, 15b attached thereto is fixed to the upper frame 11, which completes fabrication of the controller-integrated rotary electric machine 60 as a whole.

Also in the case of using the control unit 1 in the completed state, almost the same manufacturing method is used for fabrication. In this case, the connection of the terminals of the wire-wound coil 24 and the pins of the power module 14 is achieved by swaging them. The upper frame 11 of the lower layer of the completed control unit 1 and the yoke 25 are caused to press against each other while aligning the upper frame 11 with the bearing 29b and a hole for the wire-wound coil (not shown) and while causing the first inner periphery face 42 of the yoke 25 and the first outer periphery face 35 of the upper frame 11 to slide on each other. The upper frame 11 and the yoke 25 are caused to press against each other until the first and second axial positioning portions 41, 34 abut against each other.

Then, the stacked control unit 1 and motor 2 is set on a swaging machine, and the swaging jig 50 moves downward along the outer periphery of the cover 12 of the control unit 1. If the outermost periphery of the cover 12 has a diameter larger than that of the outermost periphery of the upper frame 11, the swaging jig 50 needs to move downward in a position allowing for the maximum outer diameter of the cover 12, then, when the swaging jig 50 reaches the outer periphery of the upper frame 11, the swaging jig 50 needs to move downward along the outer periphery of the upper frame 11. Then, the swaging jig 50 is similarly moved downward to apply a predetermined load, thereby completing swaging process.

As described above, moving the swaging jig in parallel with the axial direction has an advantage that the whole size and structure of the controller-integrated rotary electric machine 60 can be simplified with respect to moving the swaging jig from the outside of the outer diameter to the inside. This is because the movement of the swaging jig 50 is achieved only by the function of applying a pressure only from top to bottom in the figure. Furthermore, such swaging can be performed across the whole circumference, thereby maximizing the fastening force of the swaged portion. Thus, according to the method for manufacturing a controller-integrated rotary electric machine of the first embodiment, moving the swaging jig 50 in parallel with the axial direction causes the tip 40 of the thin-walled portion 26 of the yoke 25 housing the motor 2 to press against the abutting face 31 of the groove 30 of the upper frame 11 housing the control unit 1, which can simplify the swaged portion and perform secure swaging with a controlled pressure and stroke.

Second Embodiment

Figure 4:
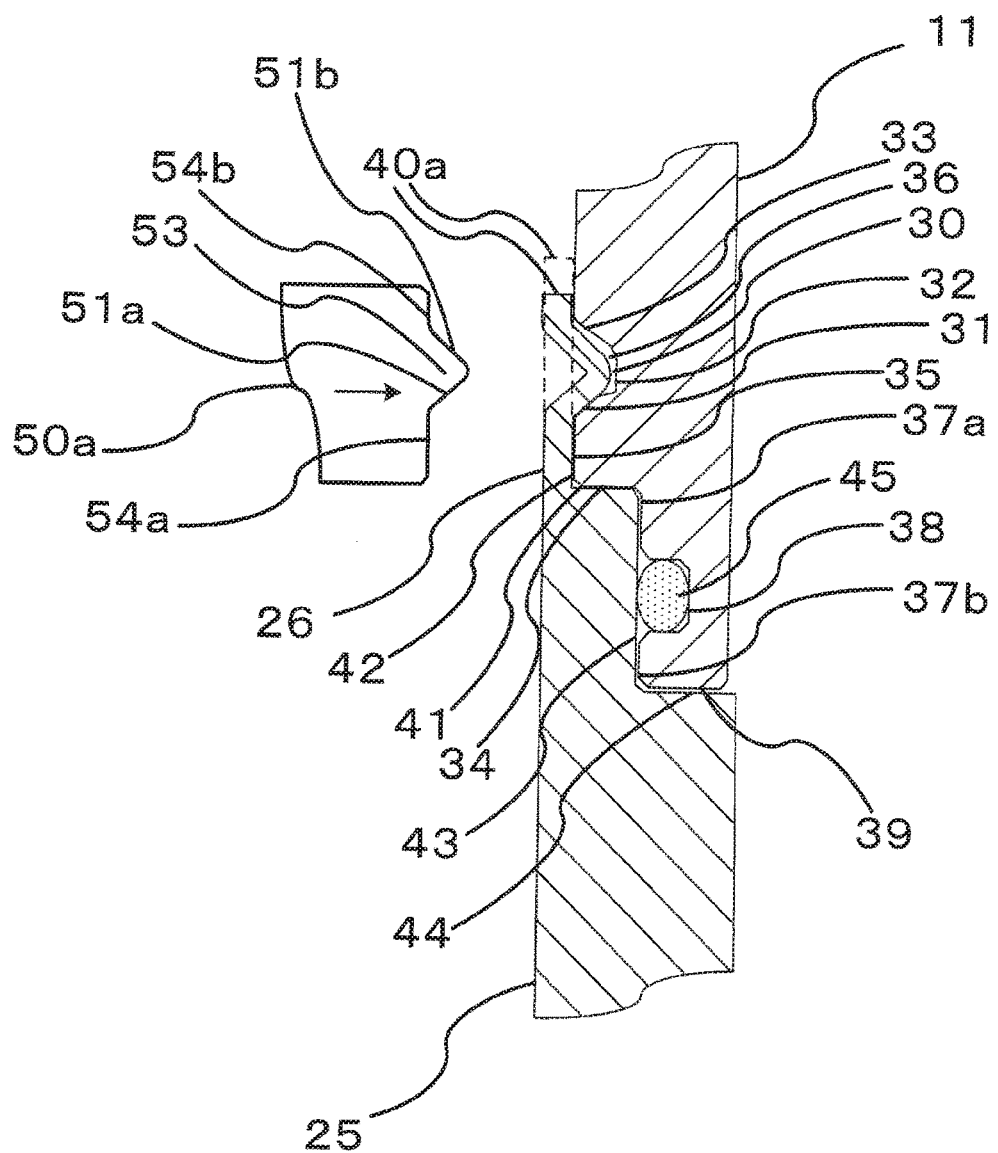
FIG. 4 is an enlarged view of a swaged portion of a controller-integrated rotary electric machine in a second embodiment of the invention.

FIG. 4 is an enlarged view of a swaged portion of a controller-integrated rotary electric machine of a second embodiment of the invention. In the second embodiment, a component denoted by a reference numeral used in the first embodiment is the same as a corresponding component of the first embodiment, and will not be repeatedly described. Furthermore, a component corresponding to a reference numeral in FIG. 2 in the first embodiment is denoted by the reference numeral appended with an alphabetical character. In the second embodiment, a thin-walled portion 26 of a yoke 25 becomes thinner in two stages. The thin-walled portion 26 to be swaged is thinner near a tip 40a and a first inner periphery face 42 is longer in comparison with the first embodiment. In the second embodiment, the yoke 25 includes a first axial positioning portion 41 having a little thickness which downward leads to a yoke-side lower inner periphery face 43 and then a yoke-side bottom 44 almost perpendicular to the axial direction in the deepest portion. The stator 22 of FIG. 1 is mounted on the inner diameter side of the yoke 25 having this thickness.

On the other hand, an upper frame 11 has a groove 30 formed in the upper portion thereof which has a cross-sectional shape similar to that of the first embodiment. In the groove 30, an abutting face 31, a groove bottom 32 extending from the abutting face 31 by a predetermined length and a groove side face 33 are continuously formed. The abutting face 31 may have an inclination angle in cross-sectional view equal to or smaller than that of the groove side face 33. Below the groove 30, a first outer periphery face 35 is formed, and further, a second axial positioning portion 34 is formed. Below the second axial positioning portion 34, frame-side lower inner periphery faces 37a, 37b extend downward. Below the frame-side lower inner periphery face 37b (the deepest portion), a frame-side bottom 39 is formed. Note that a recess 38 is formed between the frame-side lower inner periphery faces 37a, 37b, and a seal member 45 as an elastic member is mounted in the recess 38 and provides waterproof function.

As shown FIG. 4, swaging is performed such that a swaging jig 50a moves in the arrow direction radially from outside toward inside, then a protrusion 53 at the tip of the swaging jig 50a causes the thin-walled portion 26 of the yoke 25 to be plastically deformed in a V- or U-shape. In FIG. 4, a pre-swaged state of the thin-walled portion 26 is shown by a broken line that is straight, and a post-swaged state of the thin-walled portion 26 is shown by being inserted into the groove 30 in a V-shape.

A swaging method for the controller-integrated rotary electric machine of the second embodiment and the detail of the swaged structure are described below. As shown in FIG. 4, the upper frame 11 with the seal member 45 mounted therein is moved downward onto the yoke 25 to be aligned with the yoke 25. At this point, first, the first outer periphery face 35 moves downward along the first inner periphery face 42, and furthermore, the frame-side lower inner periphery face 37a moves downward along the yoke-side lower inner periphery face 43. Especially, the frame-side lower inner periphery face 37a does not need to abut against the yoke-side lower inner periphery face 43. If possible, the gap between the first inner periphery face 42 and the first outer periphery face 35 is desirably narrower than the gap between the frame-side lower inner periphery face 37a and the yoke-side lower inner periphery face 43. A swaging machine operates such that, when the first and second axial positioning portions 41, 34 abut against each other and a predetermined pressure is loaded, the upper frame 11 stops moving downward.

Next, the swaging jig 50a starts moving in the arrow direction radially from outside toward inside. The swaging jig 50a has a shape having the protrusion 53 toward radially inside. A plurality of the swaging jigs 50a are provided in the swaging machine and simultaneously start moving toward inside. Considering their balance, the number of the swaged places is desirably 3 or a multiple thereof, such as 6, 9, or 4 or a multiple thereof, such as 8, 12, in generally uniform arrangement. That is, in the first embodiment, swaging is performed across the whole circumference, however, in the second embodiment, swaging is performed only at several places. In the structure of the swaging jig 50a, an inclined face 51a in the lower portion in the figure of the protrusion 53 is especially important. The inclined face 51a needs to have the same inclination angle as that of the abutting face 31. On the other hand, an inclined face 51b in the upper portion does not need to have a precise inclination angle. The upper and lower portions of the protrusion 53 may have almost the same inclination angle or may have different inclination angles. Furthermore, the protrusion 53 of the swaging jig 50a has bottom portions 54a, 54b extending thereabove and therebelow. Both the bottom portions 54a, 54b serve as a bearing surface for preventing rising of the thin-walled portion 26 due to swaging.

The plurality of swaging jigs 50a having the shape as described above simultaneously move toward the thin-walled portion 26 and the protrusion 53 presses the thin-walled portion 26 into the groove 30. After pressing with a predetermined stroke or load, the swaging jig 50a returns to the initial position. If swaging is needed at many places, the swaging jigs 50a are rotated by a predetermined angle. Alternatively, the motor 2 and the control unit 1 are rotated by a predetermined angle and swaging is similarly performed by the swaging jigs 50a again, which enables multiple number of places to be swaged. Now, referring the swaged portion, the abutting face 31 is in close contact with the first inner periphery face 42 by a predetermined load as with the first embodiment. However, a gap 36 exists between the groove bottom 32 and the groove side face 33. Also in the second embodiment, as with the first embodiment, the yoke 25 and the upper frame 11 are swaged by the close contact between the abutting face 31 and the first inner periphery face 42 and the close contact between the first and second axial positioning portions 41, 34.

If the shape of the protrusion 53 of the swaging jig 50a and the groove 30 is formed ideally, the groove side face 33 may be in close contact with the first inner periphery face 42. However, practically, an error will occur and it is impossible to eliminate an error across a number of places. So, it is more practical to precisely finish only a key portion and cause another portion in the neighborhood to accommodate an error. Accordingly, the first inner periphery face 42 may be in close contact with the abutting face 31 and separated from the groove bottom 32 by the gap 36. Alternatively, a gap may exist between the first and second axial positioning portions 41, 34 and axial positioning may be performed by the yoke-side bottom 44 and the frame-side bottom 39.

In the second embodiment, some ingenious device is needed depending on the type of the material of the yoke 25 as the swaging side. For example, the shape of the swaged portion should be different between an iron-based material and an aluminum-based material. In the first embodiment, the swaged portion is bent by a predetermined angle, which is little affected by the type of the material. However, in the second embodiment, the swaged portion is formed into a V- or U-shape, in which folding is performed at as many as three places. Accordingly, with a material having high elongation, such as iron-based material, a swaged portion may be formed into a V-shape, and, with a material having low elongation, such as aluminum-based material, a swaged portion may be formed into a U-shape rather than V-shape, which can prevent a crack from occurring at a folded portion. The U-shape can be formed by widening the groove bottom 32 in the axial direction and increasing the roundness of the tip of the protrusion 53 of the swaging jig 50a. Considering plastic deformability and existence or non-existence of spring-back, aluminum is superior to iron. Any of both the materials may be appropriately selected depending on the shape due to the structure, the relation to the content and the like.

As described above, even when swaging is performed from radially outside at a plurality of places, swaging can be securely performed by securing the abutting face 31, perform swaging at the abutting face 31 and having a gap as a relief area at the other place so as not to cause a swaged portion to abut against a swaging portion. Furthermore, swaging can be performed more firmly by placing a distance between the swaged portion and the axial positioning portion and making the angle between the swaged portion and the axial positioning portion not so large. Furthermore, distributing the plurality of swaged portions also provides an advantage of increasing the degree of freedom of design so that, for example, when the weight balance is biased, swaging can be performed at any appropriate place near the center of gravity. Furthermore, in comparison with the case of performing swaging across the whole circumference, fastening is performed with lower swaging force, which can suppress increase in the size of jigs and facilities.

Third Embodiment

Figure 5:
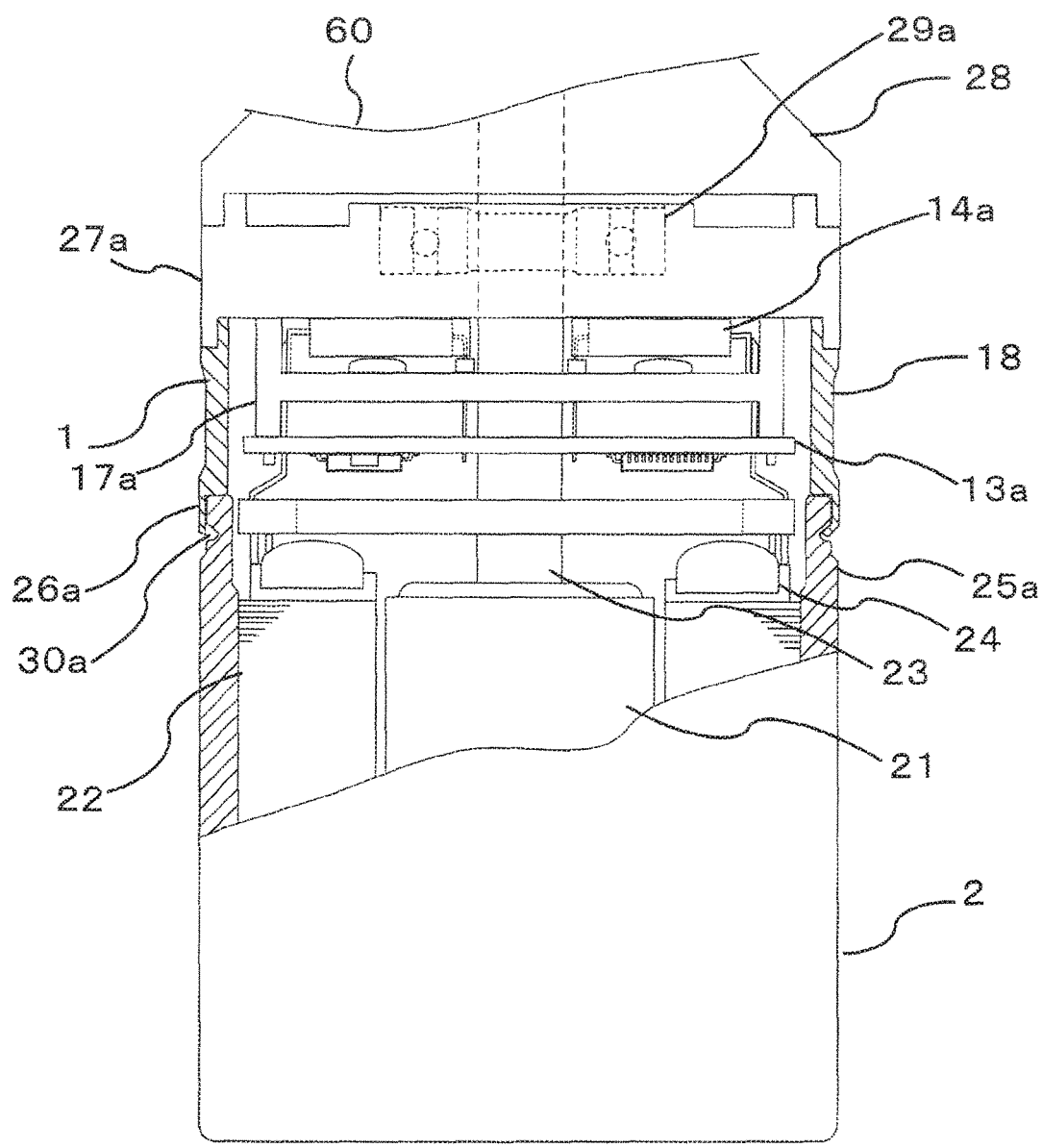
FIG. 5 is a partial cross-sectional view of a controller-integrated rotary electric machine in a third embodiment of the invention.

FIG. 5 is a partial cross-sectional view of a controller-integrated rotary electric machine in a third embodiment of the invention. In the third embodiment, a component denoted by a reference numeral used in the first embodiment is the same as a corresponding component of the first embodiment, and will not be repeatedly described. In the third embodiment, as shown in FIG. 5, a control unit 1 is placed on the output side of an output shaft 23 of a motor 2. Furthermore, in the third embodiment, in comparison with the first embodiment, a swaged side and a swaging side are reversed. Specifically, a groove 30a is provided in a yoke 25a as the swaged side, and a thin-walled portion 26a is provided in a housing 18 as the swaging side. The motor 2 has the same structure as that of the first embodiment except a swaged portion. However, components in the control unit 1 each has a center hole provided because the output shaft 23 passes through the center of the components. Note that connectors are not shown because they are placed on rear side in the figure along the outer periphery of the control unit 1.

As shown in FIG. 5, the control unit 1 includes a control board 13a, a hookup member 17a, a power module 14a and a front frame 27a, which are stacked in this order from the motor 2 side. This stacking order may also be the power module 14a, the hookup member 17a and the control board 13a from the motor 2 side. In this case, a heat sink between a wire-wound coil 24 of the motor 2 and the power module 14a and an upper frame 11 similar to that of the first embodiment which serves as a boundary wall are needed. In both configurations, swaging is performed between the housing 18 and the yoke 25a, the housing 18 especially covering the outer periphery of the control unit 1. Furthermore, the tip of the yoke 25a is thinned as a first step so that a swaged portion does not protrude from the outermost periphery of the yoke 25a. This thinned thickness is comparable to the thickness of the thin-walled portion 26a of the housing.

Figure 6:
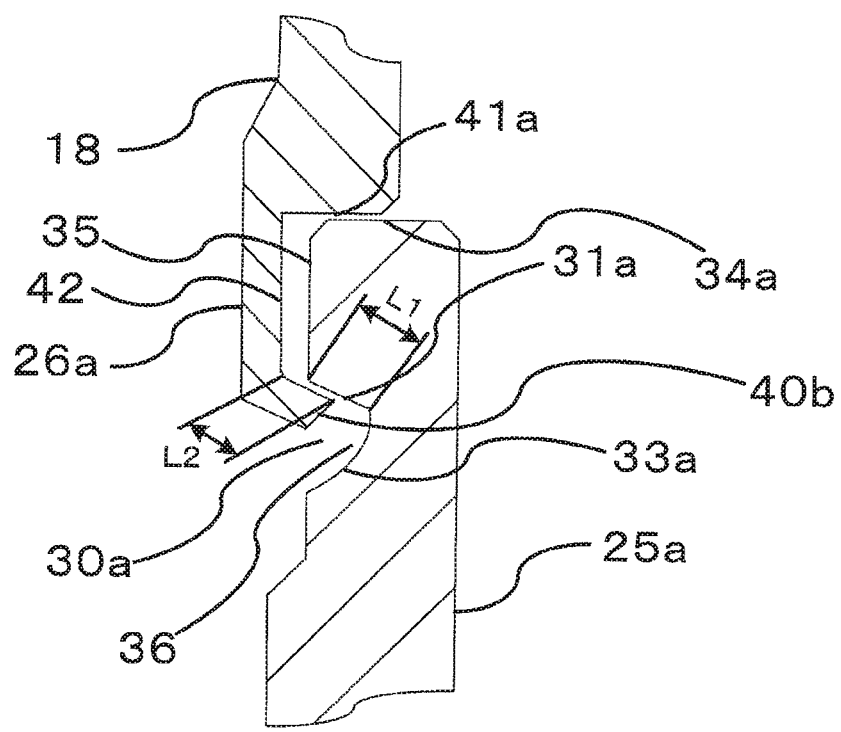
FIG. 6 is an enlarged view of a swaged portion of the controller-integrated rotary electric machine in the third embodiment of the invention.

FIG. 6 is an enlarged view of a swaged portion of the third embodiment of the invention. In FIG. 6, in order to clarify the structure, the thin-walled portion 26a of the swaging housing 18 and the groove 30a of the swaged yoke 25a are shown to be separated. Specifically, the groove 30a in cross section includes a groove side face 33a in a generally semicircular shape and an abutting face 31a having a linearly inclined cross-sectional shape. A tip 40b of the thin-walled portion 26a is folded so as to be in close contact with the abutting face 31a. At this point, there exists a relation of L1>L2, where L1 is the length of the abutting face 31a and L2 is the length of the tip 40b of the thin-walled portion 26a in close contact with the abutting face 31a. This forms a gap 36 after swaging. Note that, in this case, swaging is performed in a direction almost perpendicular to the axial direction. Accordingly, swaging may also be performed at a plurality of places the number of which is a multiple of 3 or 4 rather than across the whole circumference. As with the first and second embodiments, also in the third embodiment, a first axial positioning portion 41a abuts against a second axial positioning portion 34a, and alignment for swaging is performed between a first inner periphery face 42 and a first outer periphery face 35.

Figure 7:
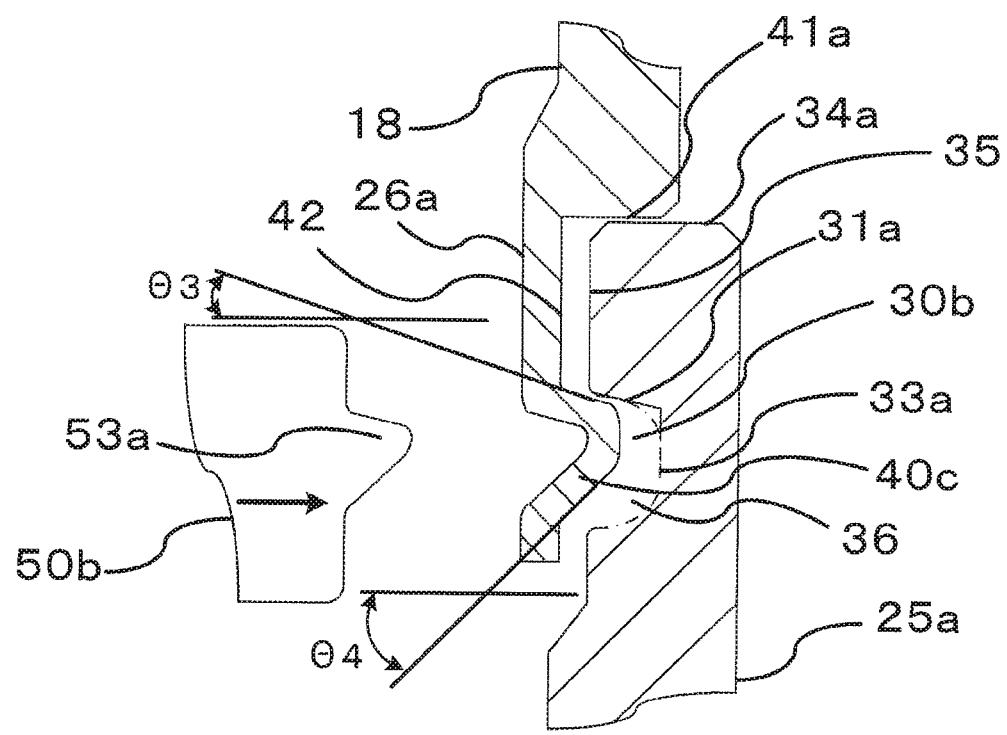
FIG. 7 is an enlarged view of a swaged portion of the controller-integrated rotary electric machine in the third embodiment of the invention.

FIG. 7 is an enlarged view of a swaged portion of a variation of the third embodiment of the invention. In FIG. 7, the shape of a groove 30b and the swaged shape are different from those of FIG. 6. In FIG. 7, the groove 30b may be formed after a yoke 25a is manufactured, for example, by cutting the yoke 25a. Or the groove 30b may also be formed together with the yoke 25a, for example, by die-cast forming. With die-cast forming, the groove can be made in any shape. However, when the groove is formed by a post-process, such as cutting, many processes may be needed depending on the shape. Even in such a case, first, cutting is performed in an oval shape in cross section drawn by an alternate long and short dash line in FIG. 7. Then, straight cutting is performed to form an abutting face 31a, completing the groove 30b. Even in the groove 30b with such a shape, the abutting face 31a having a linearly inclined cross-sectional shape is formed on the side face of the groove near a second axial positioning portion 34a. The abutting face 31a has an inclination precision higher than that of a groove side face 33a on the opposite side.

On the other hand, a thin-walled portion 26a on the swaging side has a tip 40c that is longer than the width of the groove 30b. A swaging jig 50b has a protrusion 53a in which an upper inclined face has a precise inclination angle of θ3 and a lower inclined face has an inclination angle of θ4 that does not need to be precise. At this point, θ3<θ4. The baseline of these angles is based on the faces of first and second axial positioning portions 41a, 34a. The protrusion 53a of the swaging jig 50b presses a portion near the tip 40c of the thin-walled portion 26a into the groove 30b of the yoke 25a. The portion near the tip 40c of the thin-walled portion 26a of a housing 18 is plastically deformed in an asymmetrical U-shape as shown in FIG. 7. A gap 36 is formed between the inclined face θ4 and the groove 30b. Also in this case, swaging is achieved by the swaging force between the abutting face 31a and the tip 40c of the thin-walled portion 26a and the swaging force between the first and second axial positioning portions 41a, 34a.

As described above, the housing that houses the rotary electric machine driven by the command from the control unit and the housing that houses the control unit are coupled by swaging in which one of the housings has a groove as a swaged side and the other has a thin-walled portion as a swaging side to be plastically deformed, so the coupled units have no protrusion on the outer periphery face and, even when a unit that is heavy or propagates vibration due to driving is coupled, coupling can be securely performed.

Furthermore, a swaged portion to be plastically deformed is provided to only one unit, so the swaging method and the design and manufacturing of the jig are facilitated. Furthermore, swaged or swaging side can be determined depending on the outer periphery shape of the units, which increases the degree of freedom of design.

Note that according to the invention, the embodiments may be freely combined or the embodiments may be appropriately modified or omitted within the scope of the invention.

REFERENCE SIGNS LIST 1 control unit
2 motor
11 upper frame
12 cover
13 control board
14 power module
15a connector
15b connector
16 CPU
17 hookup member
18 housing
21 rotor
22 stator
23 output shaft
24 wire-wound coil
25 yoke 26 thin-walled portion
27 front frame
28 gear mechanism
29 bearing
30 groove
31 abutting face
32 groove bottom
33 groove side face
34 second axial positioning portion
35 first outer periphery face
36 gap
37 frame-side lower inner periphery face
38 recess
39 frame-side bottom
40 tip
41 first axial positioning portion
42 first inner periphery face
43 yoke-side lower inner periphery face
44 yoke-side bottom
45 seal member
47 swaged portion
48 deepest part
50 swaging jig
52 second inner periphery face
53 protrusion
60 controller-integrated rotary electric machine

The invention claimed is:

1. A controller-integrated rotary electric machine comprising:
a first housing that houses a controller or a rotary electric machine main unit driven according to a command from the controller and that includes a thin-walled portion at an edge on an outer periphery side; and
a second housing that is coaxially aligned with the first housing and has a groove in which an abutting face having a linearly inclined cross-sectional shape is formed from the outer periphery side toward a radial direction;
a first axial positioning portion provided on the first housing and having a face perpendicular to the axial direction; and
a second axial positioning portion provided on the second housing on an edge side with respect to the groove and having a face perpendicular to the axial direction,
wherein the first housing is joined to the second housing by folding the thin-walled portion of the first housing along the abutting face of the second housing and performing swaging,
wherein the first housing is joined to the second housing by causing the first axial positioning portion to abut against the second axial positioning portion and performing swaging,
wherein a gap exists between the thin-walled portion of the first housing and the groove of the second housing,
wherein an end of the thin-walled portion contacts the abutting face of the second housing, and
wherein the gap exists between the end of the thin-walled portion and a bottom portion of the groove of the second housing.

2. The controller-integrated rotary electric machine according to claim 1, further comprising:
a first inner periphery face provided on an inner vertical face of the thin-walled portion of the first housing; and
a first outer periphery face provided between the second axial positioning portion and the groove of the second housing on the outer periphery side,
wherein the first housing is joined to the second housing by causing the first inner periphery face of the first housing to abut against the first outer periphery face of the second housing to perform positioning, folding the first inner periphery face of the thin-walled portion along the abutting face of the second housing, and performing swaging.

3. The controller-integrated rotary electric machine according to claim 1, wherein the abutting face of the groove is provided on a groove side face closer to the second axial positioning portion, and a steeper inclination angle exists between an edge of the abutting face inside the groove and the deepest part of the groove than the inclination angle of the abutting face.

4. The controller-integrated rotary electric machine according to claim 1, wherein the abutting face of the groove is provided on a groove side face closer to the second axial positioning portion, and the abutting face has a length in cross section longer than a length of a tip of the thin-walled portion swaged onto and in close contact with the abutting face.

5. The controller-integrated rotary electric machine according to claim 1, wherein the second housing houses one of the controller and the rotary electric machine main unit, the one being not housed in the first housing.

6. The controller-integrated rotary electric machine according to claim 1, wherein the swaged portion joining the first housing to the second housing is provided across the whole circumference of the first and second housings.

7. The controller-integrated rotary electric machine according to claim 1, wherein the swaged portion joining the first housing to the second housing is provided to be uniformly distributed to a plurality of places of the first and second housings.

8. The controller-integrated rotary electric machine according to claim 1, wherein the second housing includes a second groove containing a waterproof seal member.

9. The controller-integrated rotary electric machine according to claim 1, wherein the abutting face having the linearly inclined cross-sectional shape includes a first portion formed at a first angle with respect to a surface of the first housing and a second portion formed at a second angle with respect to the surface of the first housing, the second angle being larger than the first angle.

10. The controller-integrated rotary electric machine according to claim 9, wherein the thin-walled portion contacts the first portion of the abutting face without contacting the second portion of the abutting face.

11. The controller-integrated rotary electric machine according to claim 1, wherein the thin-walled portion contacts the abutting face without contacting a bottom portion of the groove.

12. The controller-integrated rotary electric machine according to claim 1, wherein a length of a portion of the thin-walled portion which contacts the abutting face is smaller than a length of the abutting face.

13. A method for manufacturing a controller-integrated rotary electric machine, comprising:
providing a first housing that houses a controller or a rotary electric machine main unit driven according to a command from the controller and that includes a thin-walled portion at an edge on an outer periphery side and a first axial positioning portion having a face perpendicular to an axial direction;
providing a second housing that is coaxially aligned with the first housing and has a groove formed from the outer periphery side toward a radial direction and a second axial positioning portion provided on an edge side with respect to the groove and having a face perpendicular to the axial direction;

fitting the first housing to the second housing by causing the first axial positioning portion to abut against the second axial positioning portion while causing a first outer periphery face provided between the second axial positioning portion and the groove on the outer periphery side to slide on a first inner periphery face provided on an inner vertical face of the thin-walled portion;

setting the first housing and the second housing fitted thereto on a swaging machine;

causing the first and second axial positioning portions to press against each other with a predetermined pressure;

joining the first housing to the second housing by moving a swaging jig of the swaging machine to fold the thin-walled portion toward an abutting face having a linearly inclined cross-sectional shape provided on an inner periphery face of the groove and perform swaging; and returning the swaging jig to the initial position, wherein a gap exists between the thin-walled portion of the first housing and the groove of the second housing, wherein an end of the thin-walled portion contacts the abutting face of the second housing, and wherein the gap exists between the end of the thin-walled portion and a bottom portion of the groove of the second housing.

14. The method for manufacturing a controller-integrated rotary electric machine according to claim 13, wherein the swaging jig moves by a predetermined distance along outer periphery faces of the first and second housings in parallel with the axial direction.

15. The method for manufacturing a controller-integrated rotary electric machine according to claim 13, wherein the swaging jig moves by a predetermined distance in a direction perpendicular to the axial direction.

* * * * *